(12) United States Patent
Toncelli (10) Patent No.: US 9,950,879 B2
(45) Date of Patent: Apr. 24, 2018

(54) APPARATUS FOR MOVING SLABS AND STORAGE WITH SUCH APPARATUS

(71) Applicant: Dario Toncelli, Bassano del Grappa (IT)

(72) Inventor: Dario Toncelli, Bassano del Grappa (IT)

(*) Notice: Subject to any disclaimer, the term of this patent is extended or adjusted under 35 U.S.C. 154(b) by 286 days.

(21) Appl. No.: 14/407,491

(22) PCT Filed: Jun. 12, 2013

(86) PCT No.: PCT/IB2013/054801
§ 371 (c)(1),
(2) Date: Dec. 12, 2014

(87) PCT Pub. No.: WO2013/186713
PCT Pub. Date: Dec. 19, 2013

(65) Prior Publication Data
US 2015/0151932 A1    Jun. 4, 2015

(30) Foreign Application Priority Data

Jun. 13, 2012  (IT) .............................. TV2012A0116

(51) Int. Cl.
*B65G 57/00* (2006.01)
*B65G 60/00* (2006.01)
(Continued)

(52) U.S. Cl.
CPC ............. *B65G 60/00* (2013.01); *B65G 57/04* (2013.01); *B65G 59/04* (2013.01); *B65G 61/00* (2013.01); *B66C 1/02* (2013.01); *B66C 7/02* (2013.01); *B66C 9/02* (2013.01); *B66C 17/06* (2013.01); *B66C 2700/01* (2013.01)

(58) Field of Classification Search
CPC .... B66C 1/02; B66C 7/02; B66C 9/02; B66C 17/06; B66C 2700/01; B66C 7/00;
(Continued)

(56) References Cited

U.S. PATENT DOCUMENTS 643,988 A * 2/1900 Seaver ................. A01B 51/023
   104/95
1,296,759 A * 3/1919 Buckley .................... B66C 7/00
   105/163.1
(Continued)

FOREIGN PATENT DOCUMENTS

EP    0879785 A2   11/1998
EP    1359101 A2   11/2003

OTHER PUBLICATIONS

PCT International Search Report dated Oct. 9, 2013 for Intl. App. No. PCT/IB2013/054801, from which the instant application is based, 3 pgs.

*Primary Examiner* — Anna M Momper
*Assistant Examiner* — Lynn E Schwenning
(74) *Attorney, Agent, or Firm* — Fredrickson & Byron, P.A.

(57) ABSTRACT

An apparatus for moving rigid slabs comprising a first carriage provided with pick-up means suitable for moving a slab. The first carriage is arranged on a supporting assembly so as to be movable in a transverse direction above a working area via first drive means or driver. The pick-up means are designed to move in a vertical direction towards or away from the working area. The apparatus is characterized in that it includes a second carriage including a support surface for slabs. The second carriage is arranged on the supporting assembly so as to be movable in a transverse direction above the working area via second drive means or driver. The first carriage is designed to move in the transverse direction independently of the second carriage. The first carriage is designed to position slabs on the second carriage and pick up slabs from the second carriage.

20 Claims, 8 Drawing Sheets

(51) Int. Cl.
  *B66C 17/06* (2006.01)
  *B65G 57/04* (2006.01)
  *B65G 59/04* (2006.01)
  *B65G 61/00* (2006.01)
  *B66C 1/02* (2006.01)
  *B66C 7/02* (2006.01)
  *B66C 9/02* (2006.01)

(58) Field of Classification Search
  CPC .... B66C 7/08; B66C 9/00; B66C 1/26; B66C 1/32; B66C 1/42; B66C 1/62; B65G 57/04; B65G 59/04; B65G 61/00; B61B 3/00
  USPC .......... 104/94, 95; 105/154, 155; 414/788.4
  See application file for complete search history.

(56) References Cited

U.S. PATENT DOCUMENTS

| | | | | |
|---|---|---|---|---|
| 3,412,439 A * | 11/1968 | Baker | ............... | B28B 13/06 414/421 |
| 3,497,089 A * | 2/1970 | Forster | ............... | B61D 9/14 104/94 |
| 3,718,263 A * | 2/1973 | Strecke | ............... | B66C 7/00 104/91 |
| 3,914,154 A * | 10/1975 | Pfeiffer | ............... | B27D 3/00 156/557 |
| 6,202,566 B1 * | 3/2001 | Hutchinson | ............... | B61B 15/00 104/118 |
| 7,410,339 B2 * | 8/2008 | Franzen | ............... | B66C 19/002 212/318 |
| 7,451,883 B2 * | 11/2008 | Wierzba | ............... | B66C 13/18 212/316 |
| 7,455,492 B2 * | 11/2008 | Weis | ............... | B66C 19/002 104/98 |
| 2005/0063815 A1 * | 3/2005 | Pierson | ............... | B65G 57/24 414/799 |
| 2006/0045672 A1 * | 3/2006 | Maynard | ............... | B25J 5/02 414/276 |
| 2008/0182737 A1 * | 7/2008 | Jost | ............... | B21D 43/18 483/14 |
| 2008/0301889 A1 | 12/2008 | Kang et al. | | |
| 2010/0266380 A1 * | 10/2010 | Dorner | ............... | B21D 43/24 414/797 |

* cited by examiner

APPARATUS FOR MOVING SLABS AND STORAGE WITH SUCH APPARATUS

RELATED APPLICATIONS

This application is a 35 U.S.C. 371 national stage filing from International Application No. PCT/IB2013/054801, filed Jun. 12, 2013, and claims priority to Italian Application No. TV2012A000116, filed Jun. 13, 2012, the teachings of which are incorporated herein by reference.

FIELD OF THE INVENTION

The present invention relates to an apparatus for moving slabs.

In particular, the present invention relates to an apparatus for moving rigid slabs, for example of stone, stone-like material, glass, etc.

BACKGROUND

In the sector relating to the production of slabs of stone material it is known to provide a store situated at the end of the production lines and intended to store the slabs.

A particular type of such a store comprises on the ground a store area formed by one or more rows of locations for depositing slabs (for example 5 to 10 rows), each comprising a plurality of depositing locations (for example 20, 30 or more), several slabs being stacked in each location so as to form a pack. A series of rows containing stacks of slabs arranged side-by-side is thus formed in the storage area. A structure or beam is arranged above the depositing locations and extends transversely with respect to the longitudinal direction of the rows of depositing locations, being movable in the longitudinal direction.

The beam slides along guides or rails which may be arranged at a certain height, so as to thus form a structure similar to a gantry crane, or on the ground in which case the structure has a portal-like configuration.

A carriage travels along the beam of the structure and has a suction surface or a sucker-carrying surface which is movable in the vertical direction between a completely raised position, where the suction or sucker-carrying surface is situated at the maximum height from the ground, and a lowered position, where the surface is located at the minimum height from the ground.

At one end of the store there are loading stations each situated at the end of the manufacturing or production lines and the slab unloading stations.

During loading, the structure moves longitudinally and the carriage instead moves along the beam of the structure so that the suction or sucker-carrying surface is positioned exactly above the loading station where a pack of slabs is situated. The surface is lowered until it rests on the first slab of the pack of slabs, the vacuum is activated and the top slab in the pack of slabs is thus engaged. The surface is raised and brought opposite a depositing location of the store, moving both the structure and the carriage along the beam. Following which the suction or sucker-carrying surface is lowered until the slab is rested on the first slab of the stack, the vacuum is deactivated and the slab is thus deposited.

The operation is repeated several times until all the slabs in the pack of slabs have been stored.

The unloading operation is performed with the reverse sequence. The structure and the carriage are moved along the beam until the suction or sucker-carrying surface is positioned exactly above the stack of slabs from which a slab is to be removed, the suction or sucker-carrying surface is lowered until it rests on the first slab of the pack and the vacuum plant is activated so as to engage the slab. The structure and the carriage are displaced so as to move the suction or sucker-carrying surface above the unloading station, the surface is lowered until the slab is rested on the unloading station and finally the vacuum is deactivated, thus releasing the slab.

BRIEF SUMMARY OF EMBODIMENTS OF THE INVENTION

The operation is repeated several times until the desired pack of slabs has been formed in the unloading station.

Stacks of slabs normally with the same or similar characteristics are formed in the store, said characteristics relating to:

size, e.g. length, width and thickness;
appearance, e.g. colour, tonality or surface finish;
quality, e.g. veining and lack of defects.

In terms of quality, the slabs may be classified as first choice, second choice, third choice, etc., up to about ten different levels, starting from the highest quality level down to the lowest.

At the end of each production line the characteristics of each incoming slab are determined and, on the basis of these characteristics, it is decided on which stack in the store the slab is to be deposited. In this way the slabs are grouped together in the store in stacks which each contain slabs of the same or similar size, appearance and quality.

When a request to unload slabs from the store is received, the system is moved so as to remove the required slabs from the various stacks and form a stack of slabs in the unloading zone.

However, during unloading, the request to be dealt with may be one where a pack consisting of a certain number of slabs with the same or similar characteristics must be formed, or one where slabs with different characteristics must be formed.

Therefore, depending on the request, namely the number of slabs to be removed and the required characteristics (size, appearance and quality), it is required to move the suction or sucker-carrying surface in each case opposite the various stacks containing the type of slab to be removed, pick up the slab and move it to the unloading station, thus forming a stack containing all the required slabs.

Since with a store of this type it is possible to load and unload only one slab at a time, moving every time the structure, the carriage with the suction or sucker-carrying surface, and the surface itself, between a pick-up stack and the unloading stack, the time required to unload a pack of slabs situated in the store and to form a pack of slabs leaving the store is very long.

A number of apparatus which attempt to solve such a technical problem are known in the prior art. These apparatus have, for example, an intermediate station, for example equipped with extractable forks on which a pack of slabs may be formed. This solution is usually combined with a store comprising shelves which are also arranged in several rows and on which the slabs or packs of slabs may be positioned.

These types of store, however, are very costly because they envisage a dedicated zone which is designed with shelving of a suitable type and a complex movement system for performing loading and unloading. Moreover, the use of shelves means that it is possible to obtain packs formed only by a limited number of slabs.

The object of the invention is therefore to provide an apparatus for moving slabs and a store for slabs which are not affected by the drawbacks of the prior art mentioned above.

In view of this object, according to the principles of the present invention, it has been thought to provide an apparatus for moving slabs according to claim 1. Moreover, it has been thought to provide a store according to claim 13. Moreover, it has been thought to provide a method for positioning and forming packs of slabs according to claims 17-20.

BRIEF DESCRIPTIONS OF DRAWINGS

The characteristic features and advantages of an apparatus for moving slabs and a store which are designed by applying the principles of the present invention will emerge more clearly from the description below of a number of examples of embodiment provided by way of a non-limiting example with reference to the accompanying drawings in which.

DETAILED DESCRIPTION OF EMBODIMENTS OF THE INVENTION

Figure 1:
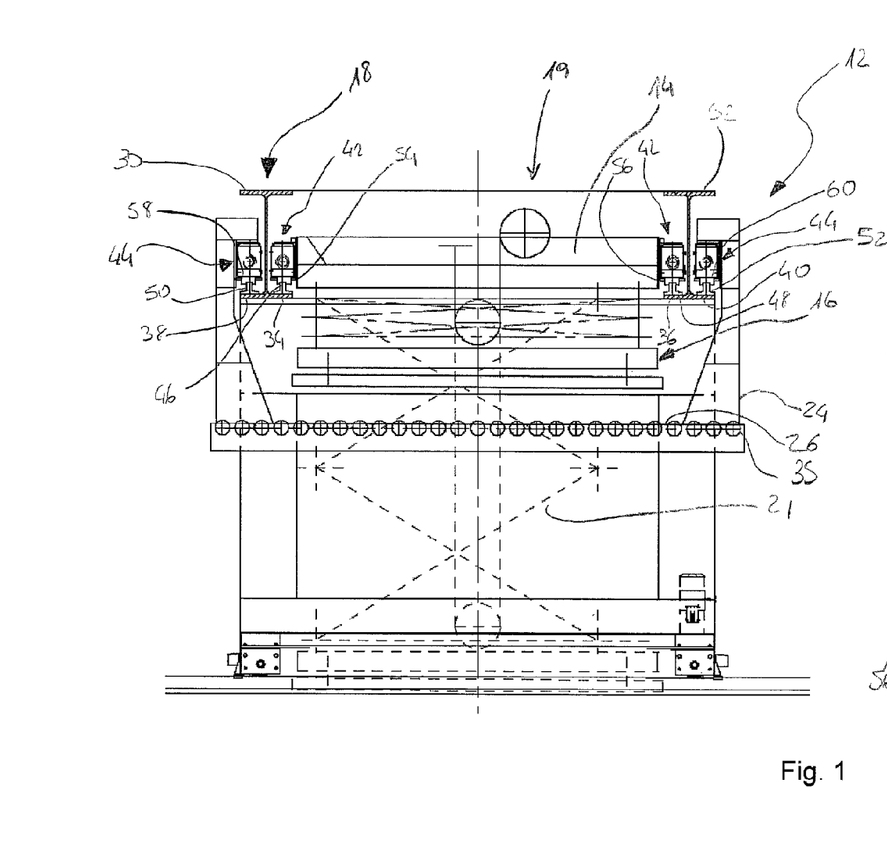
FIG. 1 shows schematically a front view of the apparatus according to the present invention.
Figure 2:
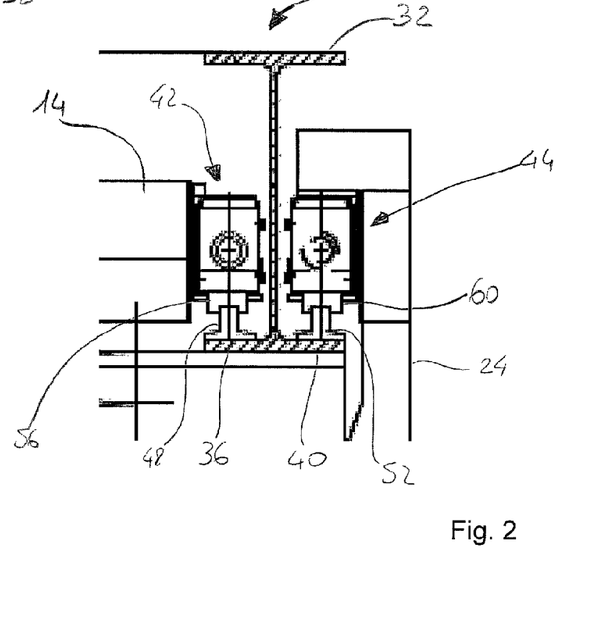
FIG. 2 shows a front view of a detail of the apparatus according to FIG. 1.

FIG. 1 shows an apparatus 12 for moving slabs. In particular, the apparatus may be advantageously used for rigid slabs consisting of stone, stone-like material, glass, etc. As will become clear below, such an apparatus is intended to be used in particular in a store for slabs where the slabs are arranged on the ground in the form of a plurality of stacks situated in a working area 20 and the apparatus 12 is movable above the working area via suitable means or a horizontal displacement system so as to move between the stacks of slabs. The store may also have arrival areas and departure areas for the slabs to be loaded and unloaded into/from the store. As will be described below, the displacement means may advantageously be realized with a structure in the form of a portal (FIGS. 5 and 6) or a gantry crane (FIG. 3).

As can also be seen from FIG. 1, the apparatus 12 comprises a first carriage 14, or raising carriage, which is provided with pick-up means 16 suitable for picking up a slab by gripping it at the top.

Figure 3:
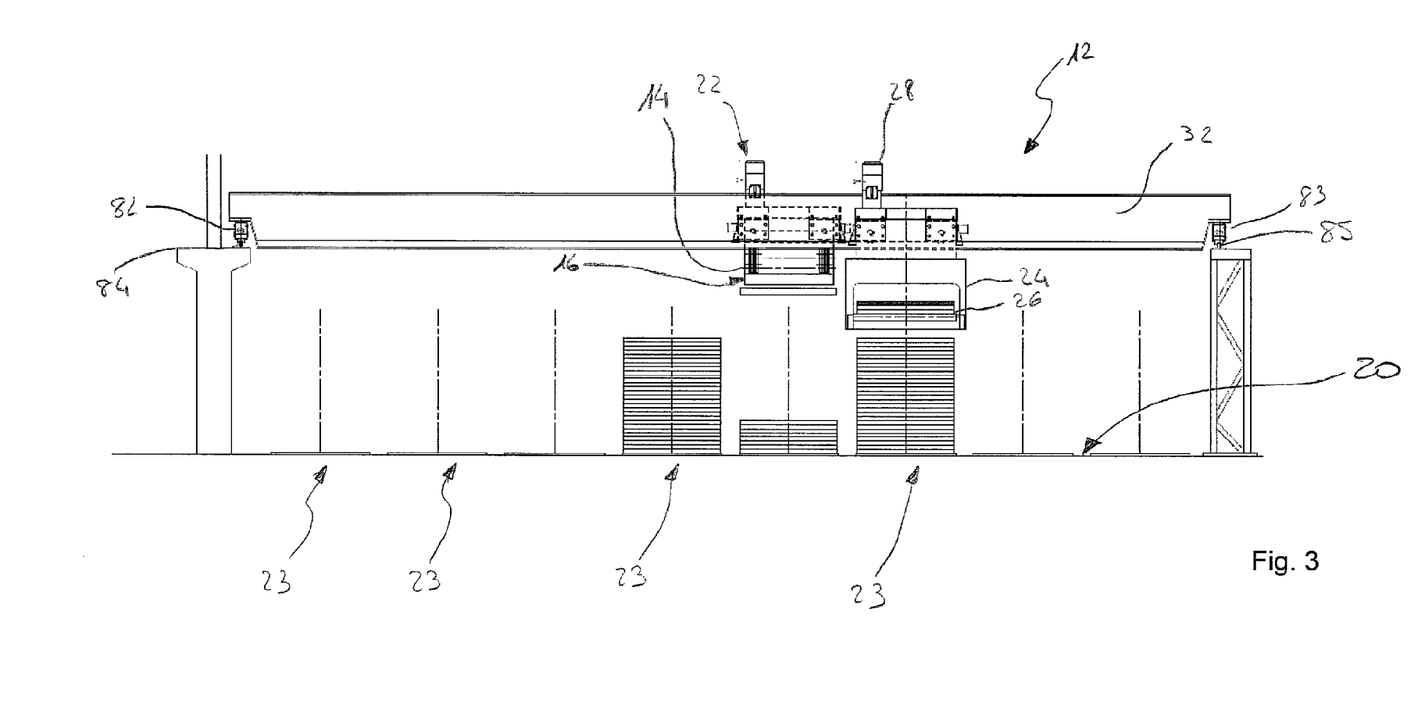
FIG. 3 shows a side view of a possible embodiment of a store with an apparatus according to the present invention.

The first carriage 14 is arranged on a supporting assembly 18 so as to be movable in a transverse direction above a working area 20 via first drive means or driver 22 (schematically shown in FIG. 3). The pick-up means 16 are designed to move in a vertical direction towards or away from the working area 20. The apparatus 12 also comprises a second carriage 24, or support carriage, arranged on the supporting assembly 18 so as to be movable in a transverse direction above the working area 20 via second drive means or driver 28 (shown schematically in FIG. 3). This second carriage 24 comprises in turn a support surface 26 for the slabs.

The first carriage 14 is designed to move in the transverse direction independently of said second carriage 24, and the first carriage 14 is designed to position slabs on the second carriage 24 and pick up slabs from the second carriage 24.

Advantageously, the pick-up means 16 may be a suction surface or a surface provided with suckers, both known per se.

According to a possible embodiment of the present invention, said pick-up means are movable vertically by means of an electric winch (generally denoted by the reference number 19) and a pantograph structure 21 which acts as a guide.

According to a first embodiment of the present invention, the supporting assembly 18 comprises a first beam 30 and a second beam 32 in the form of a double T. The beams 30, 32 are parallel to each other and arranged in the transverse direction. Advantageously they comprise inner flanges 34, 36 facing each other and outer flanges 38, 40. The inner flanges 34, 36 are provided with first sliding-travel means 42 for the sliding-travel of the first carriage 14. Second sliding-travel means 44 for the second carriage 24 are provided on the outer flanges 38, 40.

The first sliding-travel means 42 may comprise inner rails 46, 48 arranged respectively on the inner flange 34 of the first beam 30 and on the inner flange 36 of the second beam 32.

The second sliding-travel means 44 may comprise outer rails 50, 52 arranged respectively on the outer flange 38 of the first beam 30 and on the outer flange 40 of the second beam 32.

Advantageously, the first carriage 14 may be provided with wheels 54, 56 suitable for travelling on the inner rails 46, 48. Moreover, the second carriage 24 may be provided with wheels 58, 60 suitable for travelling on the outer rails 50, 52.

The second carriage 24 is used for temporarily depositing the slabs to be loaded in the store and/or the slabs to be unloaded from the store.

The support surface 26 of the second carriage 24, which may comprise a motor-driven rollerway 35 (clearly visible in FIG. 1) is advantageously positioned at a set height greater than the maximum height which may be reached by the stacks of slabs in the underlying store area, so as to be able to pass above them when it is moved.

Advantageously, the first carriage 14 provided with a raising surface is designed so as to be able to intersect second carriage 24 so as to be able to pass from one side to the other of the second carriage 24 along the beams 30, 32.

In accordance with a possible embodiment of the present invention, the supporting assembly 18 is designed to move in a longitudinal direction owing to drive means (not shown) known per se.

According to a first embodiment of the present invention, the supporting assembly 18 may comprise a portal-like structure (shown for example FIGS. 5a-5f). In this case, the beams 30, 32 are connected to lateral supports 62, 64 which travel longitudinally on respective guides or rails 80, 81.

According to an alternative embodiment, the supporting assembly 18 may comprise a gantry crane structure (shown for example in FIG. 3) in which the beams 30, 32 terminate with motor-driven bogies 82, 83 for displacement along suspended rails 84, 85.

In the embodiment of the present invention shown in FIG. 3, the apparatus according to the present invention consists of rows of depositing locations (for example eight rows, indicated by the reference number 23) arranged side-by side in the transverse direction parallel to the beams 30, 32, each of the rows being formed by a plurality of locations, for example 15 or 20, so as to obtain a grid-like arrangement of the locations (and therefore of the stacks of slabs) in the store area. Obviously, the number of rows and the number of locations in the row may be different depending on the specific practical requirements, as may be easily imagined by the person skilled in the art.

Figure 4A:
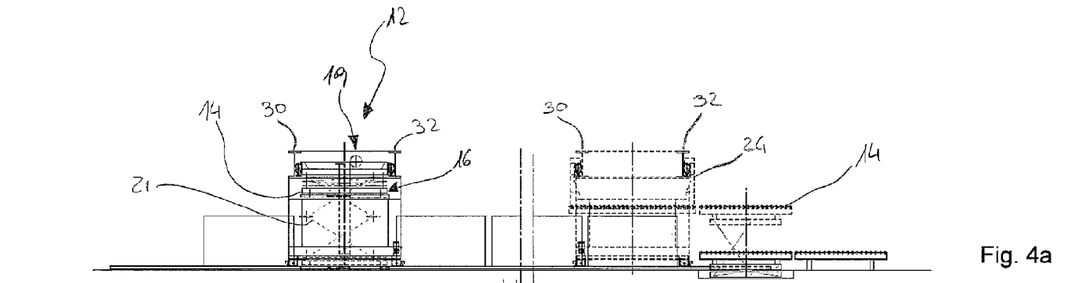
FIGS. 4a-4b show in schematic form, respectively, a side view and a top plan view of a store according to another possible embodiment of the present invention with the apparatus according to FIG. 1.
Figure 4B:
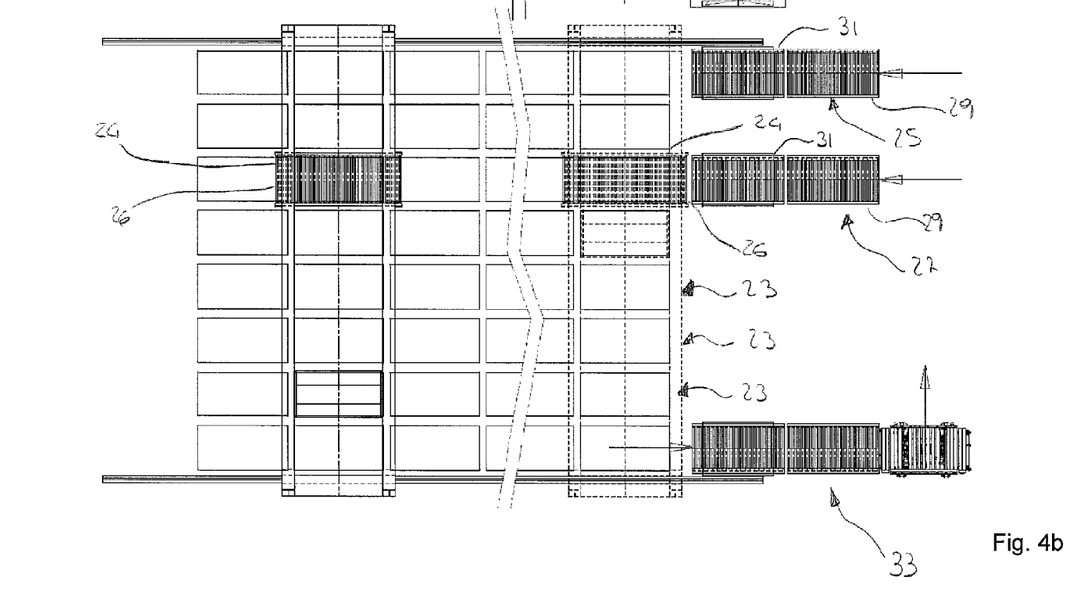

According to the embodiment shown in FIGS. 4a-4b, the terminal ends of production lines (for example two lines, indicated by the reference numbers 25, 27), from which the slabs to be stored arrive, are positioned at one end of said rows of locations 23. Each line comprises advantageously a rollerway 29 along which the slabs slide, ending up in an arrival area or loading station 31. The arrival areas 31 are advantageously positioned adjacent to a row 23 of depositing locations inside the store area.

Similarly a departure area or unloading station 33 is also provided, where the slabs removed from the store are deposited and which is also advantageously positioned adjacent to a row of depositing locations 23.

In the embodiment shown, the arrival and departure areas or stations are shown on the same side of the store area, but may also be arranged on opposite sides. Moreover, their number may vary depending on the plant requirements.

Advantageously, the loading and/or unloading stations may be each provided with a raising platform, for example a raisable motor-driven rollerway 70 (as can clearly seen in FIGS. 8a-8c and in FIGS. 9a-9c) which is mounted on a hydraulic platform so as to be able to be raised and reach the same height as the support surface for the slabs on the second motor-driven carriage 24.

As a result of the raisable platform, packs of slabs may be moved between the support surface on the second carriage and the entry or exit station.

With reference to FIGS. 5a-5b and 9a-9c, a possible sequence of steps for positioning a slab in the store will now be described.

When a pack of slabs arrives along one of the lines so as to be present in one of the two loading stations, it is raised by means of the respective raising device 70 and, at the same time, the supporting assembly 18 is moved so as to be positioned opposite the arrival line (generally above the first transverse row of depositing locations 23) and the second carriage 24 is moved so that its support surface 26 is aligned with the raising device 70 of the loading station.

Once the raising device and the surface of the carriage are aligned, the pack of slabs or the slab passes from the rollerway 70 onto the support surface 26, if necessary passing across a connecting rollerway (not shown).

In the case where the slabs arrive one at a time and in the case where no raising devices 70 are provided, it is also possible to use the first carriage to raise the slab from the arrival station and position it on the second carriage, creating a stack of slabs directly on the latter. In any case, the loading operations are quick, since the carriages do not have to travel long distances for each slab, as instead occurs in the prior art.

In either case, the supporting assembly 18 is then moved so as to be positioned above the depositing location 23 where the first slab of the pack of slabs loaded on the surface of the second carriage 24 is unloaded.

The raising surface 16 of the first carriage is positioned above the pack of slabs on the second carriage (FIG. 5b) and then lowered until it comes into contact with the first slab of the pack of slabs, the vacuum is activated and the top slab is engaged.

Figure 5A:
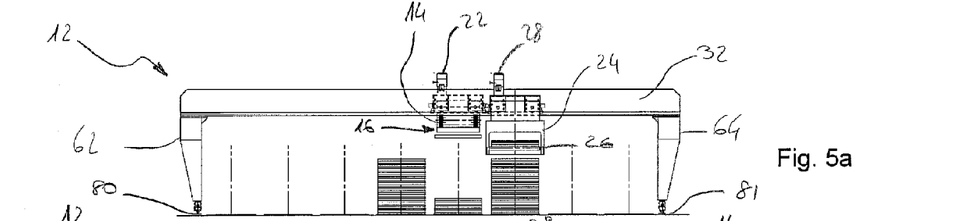
FIGS. 5a-5f show a sequence of steps for loading a slab from the store in FIG. 4 according to the present invention.
Figure 5B:
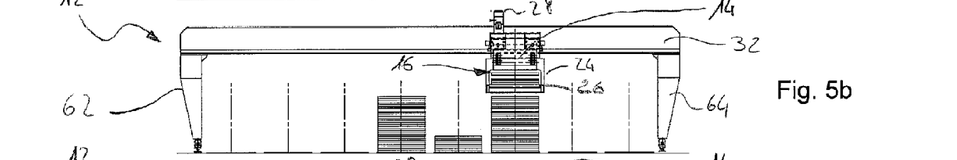
Figure 5C:
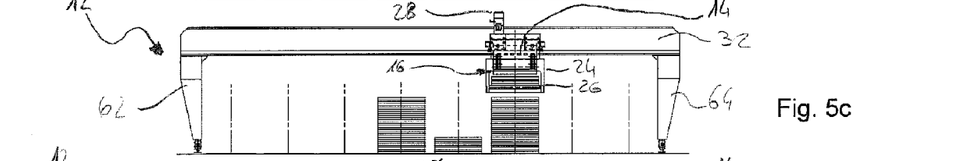
Figure 5D:
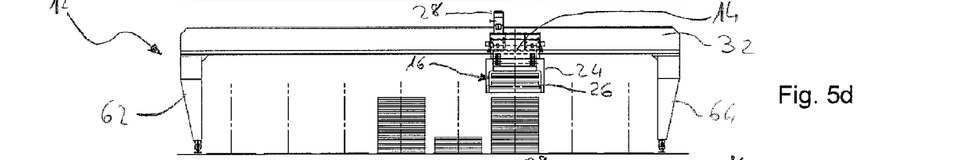
Figure 5E:
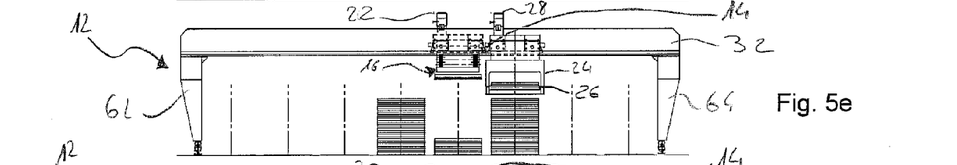

The raising surface 16 is raised together with the engaged slab and then the first carriage 14 moves until it is positioned above the depositing location (FIG. 5e).

Figure 5F:
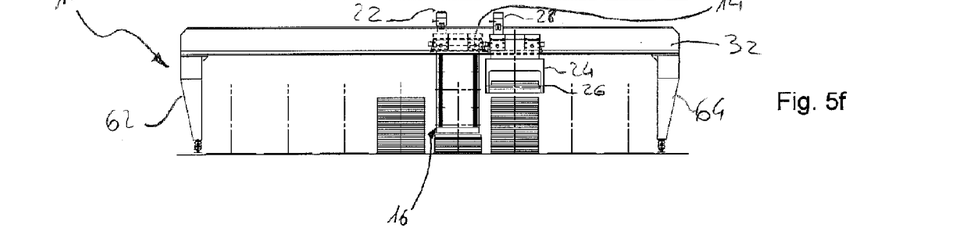

The raising surface 16 may thus be lowered until the slab rests on the top slab of the stack of slabs in the depositing location; the vacuum is removed and the slab is released onto the stack (FIG. 5f).

The above operations are repeated for each slab in the pack of slabs which is present on the support surface 26, namely the raising surface 16 is raised and the first carriage 14 is moved in order to pick up a new slab from the pack and then moved again (if necessary together with the supporting assembly 18) in order to deposit the slab in the previous depositing location or in another location. Since the second support carriage with the pack of slabs to be stored may follow the first raising carriage, the operation of unloading the entire pack is rapid.

With reference to FIGS. 6a-6b and 8a-8c, a possible sequence of steps for unloading a slab in the store will now be described.

Figure 6A:
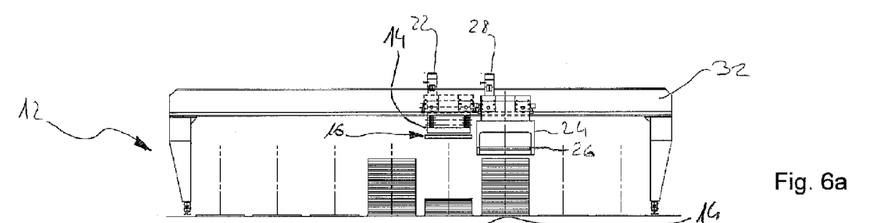
FIGS. 6a-6f show a sequence of steps for unloading a slab from the store in FIG. 4 according to the present invention.

The supporting assembly 18 and the first carriage 14 with the raising surface (for example suction or sucker-carrying surface) 16 are moved so that the surface is positioned above the depositing location in the store from where the slab is removed (FIG. 6a).

Figure 6B:
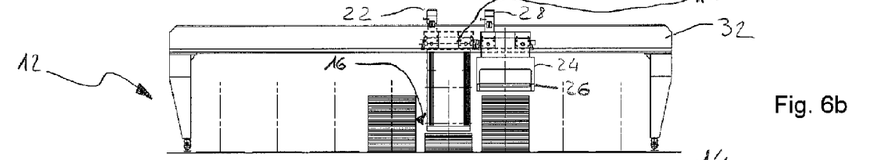

The raising surface 16 is lowered until it rests on the first slab of the stack, the vacuum is activated and the slab is engaged (FIG. 6b).

Figure 6C:
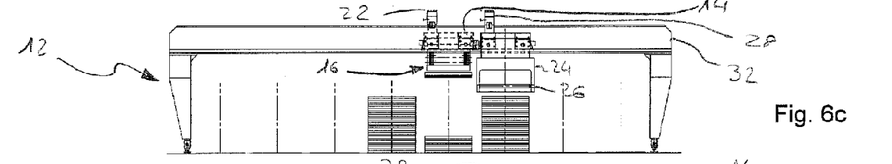
Figure 6D:
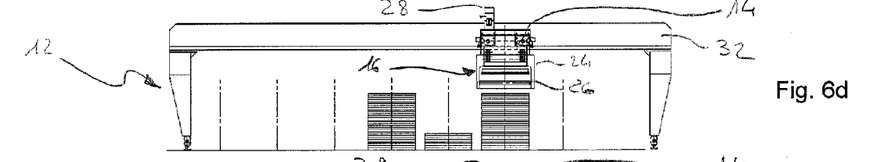
Figure 6E:
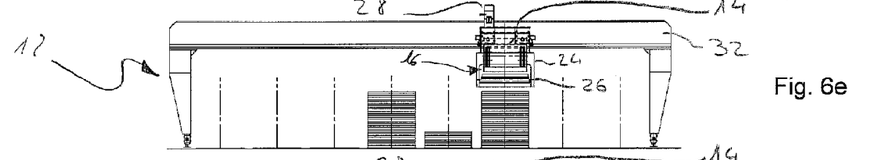
Figure 6F:
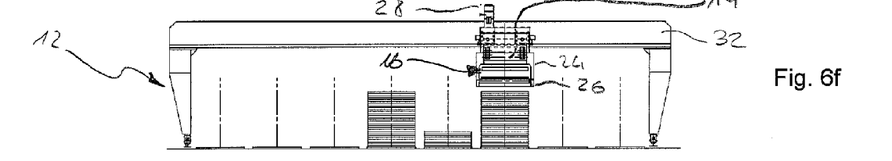

The raising surface 16 is raised and is moved until it is positioned above the support surface 26 of the second carriage and then lowered until the slab rests on the surface or on the slabs which may already be present thereon (FIGS. 6c-6e). Finally the vacuum plant is deactivated and the slab is then released.

The above operations are repeated, namely the (suction or sucker-carrying) surface 16 is raised and positioned above the same stack (if a similar slab is to be removed) or positioned above a new stack (moving if necessary the supporting assembly 18) so as to pick up a new slab and then deposit it on the support surface 26.

When the pack has been completed or the support surface 26 has reached its maximum capacity in terms of weight (for example 3000 kg) or its maximum capacity in terms of height of the pack of slabs, the supporting assembly 18 is moved so as to be positioned in the unloading position (for example above the first transverse row of depositing locations 23), the second carriage is moved so that the support surface is adjacent to the unloading location and, at the same time, the raising device 70 of the unloading location 33 is raised so as to be aligned with the support surface 26.

The pack of slabs passes from the support surface 26 to the rollerway of the raising device 70 of the unloading location 33 and the raising device is lowered and the pack of slabs is able to travel along the slab unloading line and exit the store.

As already mentioned above, the slab-pack support surface 26 of the second carriage 24 may advantageously consist of a motor-driven rollerway.

The depositing locations adjacent to the two loading stations 31 and unloading station 33 are depositing locations to all effects in that they may also contain a stack of slabs.

Although the use of raising devices minimizes the pack unloading time, if required the single slabs may also be picked up by means of the raising surface of the first carriage, as is now obvious to the person skilled in the art. The movement path is in any case minimized compared to the systems of the prior art, since the pack to be unloaded is brought close to the unloading location.

Figure 7A:
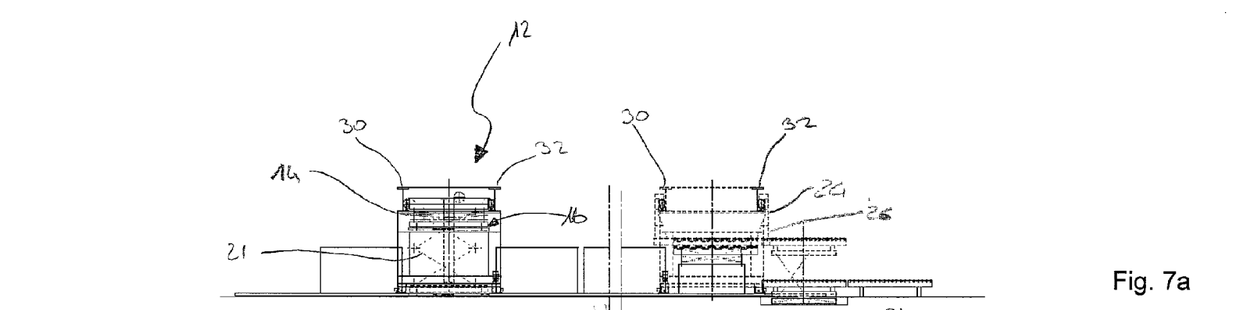
FIGS. 7a-7b show, respectively, a side view and a top plan view of a store with the apparatus according to a possible embodiment of the present invention.
Figure 7B:
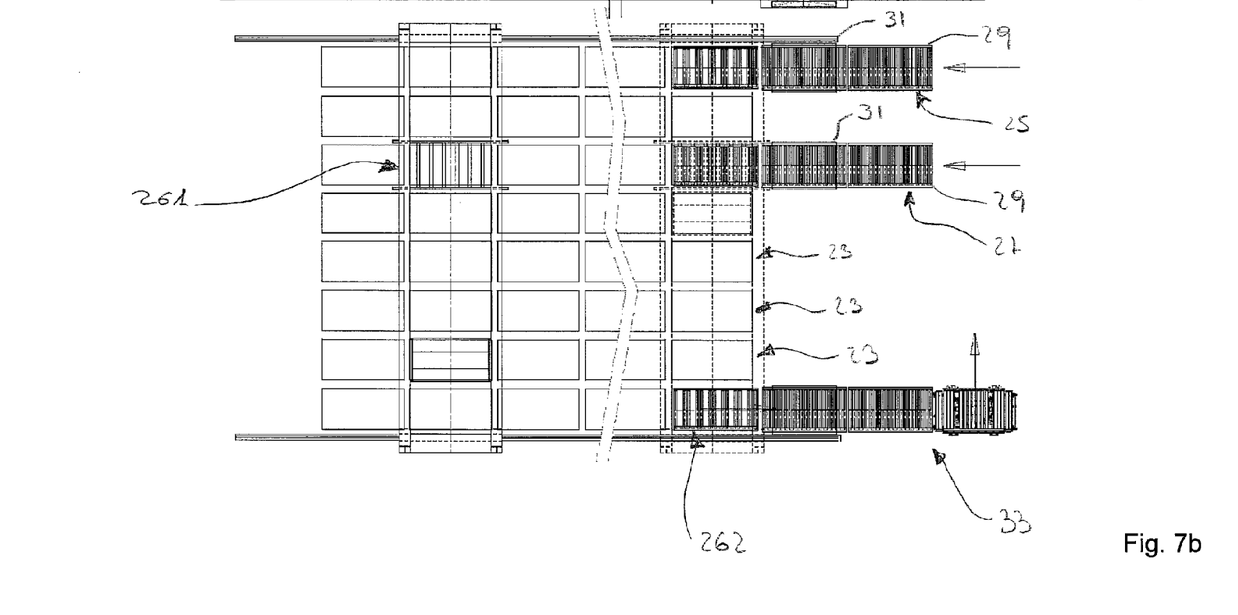

FIGS. 7*a*-7*b* show a further alternative embodiment of the present invention in which:

- the slab support surface 26 consists of a frame provided with cross members 261;
- underneath the support surface 26 there is a raisable motor-driven rollerway 262 such that the rollers thereof may be inserted in between the cross members 261 of the support surface 26 so that the rollers reach a position which is slightly raised with respect to the cross members 261.

Figure 9A:
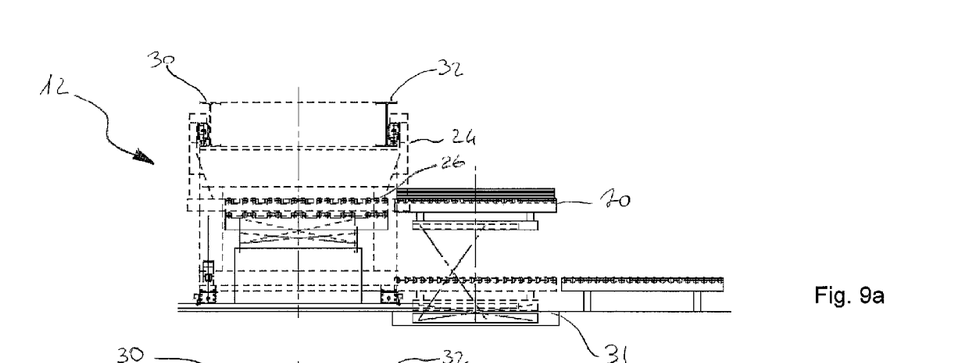
FIGS. 9a-9c show a sequence of steps for operation of an apparatus according to the present invention during loading of a slab.
Figure 9B:
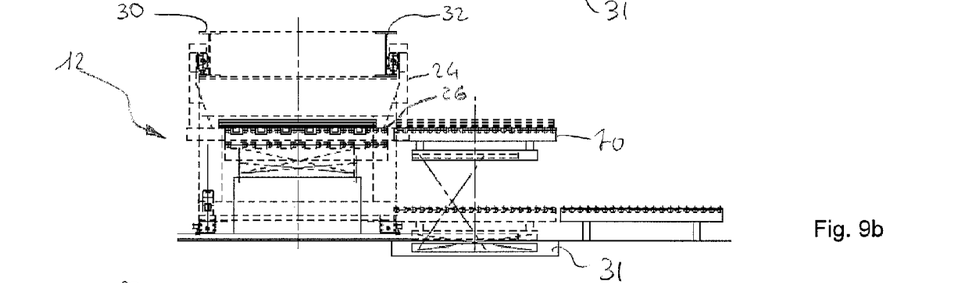
Figure 9C:
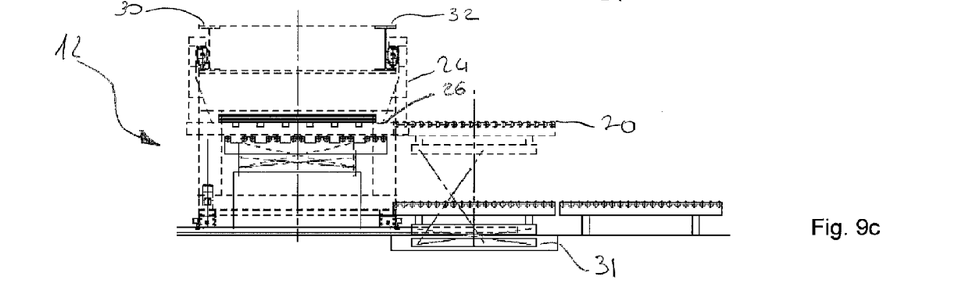

FIGS. 9*a*-9*c* show the various steps for loading a pack of slabs in a store according to the embodiment shown in FIGS. 7*a*-7*b*.

This step is performed in a manner similar to the loading step described above with the difference that, before the pack of slabs passes from the motor-driven rollerway 70 of the loading station 31 to the support surface 26:

- the raisable rollerway 262 situated underneath the support surface 26 is raised, such that its rollers pass in between the cross-struts 261 of the support surface 26, thus being aligned with the motor-driven rollerway 70 of the loading station 31;
- the pack of slabs passes from the motor-driven rollerway 70 to the raisable rollerway 262;
- the raisable rollerway 262 is lowered and the pack of slabs is rested on the support surface 26.

Figure 8A:
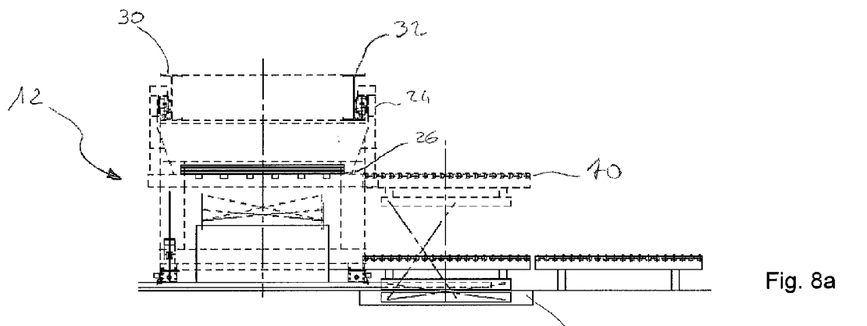
FIGS. 8a-8c show a sequence of steps for operation of an apparatus according to the present invention during unloading of a slab.
Figure 8B:
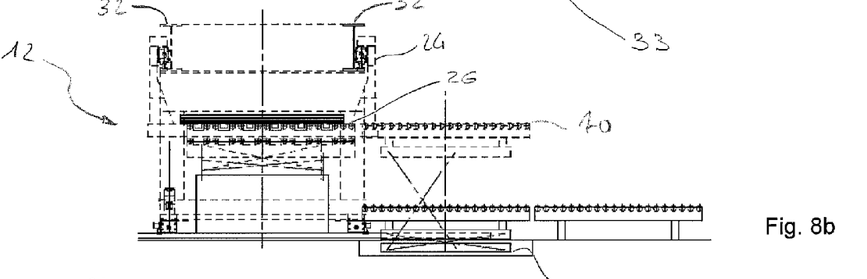
Figure 8C:
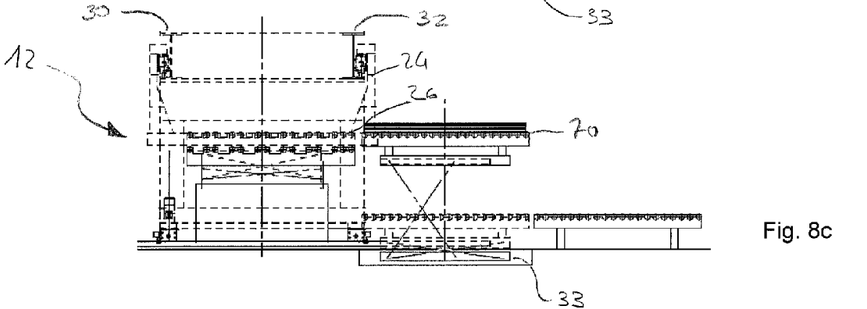

FIGS. 8*a*-8*c* show the various steps for unloading a pack of slabs from the store.

This step is performed in a manner similar to the unloading step described above with the difference that, before the pack of slabs passes from the support surface 26 to the motor-driven rollerway 70 of the loading station 33:

- the raisable rollerway 262 is raised and the pack of slabs is raised by the support surface 26 and the raisable rollerway 262 is thus aligned with the motor-driven rollerway 70 of the unloading station 33;
- the pack of slabs passes from the raisable rollerway 262 to the motor-driven rollerway 70;
- finally, the raisable rollerway 262 is lowered.

At this point, the advantages compared to the apparatus for moving slabs according to the prior art are evident.

A first advantage consists in the significant reduction both of the time needed to load slabs in the store and of the time needed to unload slabs from the store, with consequent benefits in economic terms.

A second advantage of the present invention is that of providing an apparatus for moving slabs inside a store which is able to form a pack of slabs for unloading very quickly.

A further advantage of the present invention is that of providing an apparatus for moving slabs inside a store which does not require a supporting structure for the slabs, i.e. a set of shelves, in order to increase the capacity of the store and its capacity to contain different-size slabs.

With regard to the embodiments described above, the person skilled in the art may, in order to satisfy specific requirements, make modifications to and/or replace elements described with equivalent elements, without thereby departing from the scope of the accompanying claims.

For example a different number of loading stations and unloading stations may be provided. Instead of the raisable rollerways 70 of the unloading stations it is possible to envisage a motor-driven rollerway movable vertically from a position on the ground (aligned with the rollerways of the loading and unloading lines) up to a height from the ground greater than the maximum height which a stack of slabs may reach. Other known systems may also be used, as may now be easily imagined by the person skilled in the art.

The invention claimed is:

1. Apparatus for moving rigid slabs comprising a first carriage provided with pick-up means having a raising surface that grips and raises the entire slab, said pick-up means are vacuum-type pick-up means for gripping a top surface of the slab, said first carriage being arranged on a supporting assembly so as to be movable in a transverse direction above a working area via a first driver, said pick-up means movable in a vertical direction towards or away from the working area, said supporting assembly comprising a first beam and a second beam parallel to each other and arranged in the transverse direction, wherein said apparatus further comprises:

- a second carriage which comprises a support surface for slabs and is arranged on said supporting assembly so as to be movable in a transverse direction above the working area;
- said first carriage configured to position slabs on said second carriage and remove the slabs from said second carriage by means of said pick-up means having said raising surface, said first carriage provided to intersect said second carriage and be passable from one side to the other of said second carriage along said first and second beams.

2. The apparatus of claim 1, wherein said first carriage is movable in the transverse direction independently of said second carriage which is movable via a second driver.

3. The apparatus of claim 1, wherein said first and second beams are in the form of a double T, said first beam being parallel to said second beam, said first and second beams arranged in the transverse direction and comprising inner flanges facing each other and outer flanges, said inner flanges being provided with first sliding-travel means enabling sliding-travel of said first carriage, and said outer flanges being provided with second sliding-travel means for said second carriage.

4. The apparatus of claim 3, wherein said first sliding-travel means comprise inner rails arranged respectively on said inner flange of said first beam and on said inner flange of said second beam.

5. The apparatus of claim 4, wherein said first carriage is provided with wheels movable on said inner rails.

6. The apparatus of claim 3, wherein said second sliding-travel means comprise outer rails arranged respectively on said outer flange of said first beam and on said outer flange of said second beam.

7. The apparatus of claim 6, wherein said second carriage is provided with wheels movable on said outer rails.

8. The apparatus of claim 1, wherein said supporting assembly is movable in a longitudinal direction along rows of slabs or stacks of slabs.

9. The apparatus of claim 8, wherein said supporting assembly comprises a structure in the form of a portal.

10. The apparatus of claim 8, wherein said supporting assembly comprises a structure in form of a gantry crane.

11. The apparatus of claim 1, wherein said support surface of said second carriage comprises a motor-driven rollerway.

12. Store for slabs, comprising an area for receiving a plurality of stacks of slabs and a movement system comprising an apparatus movable above the plurality of stacks for depositing and picking up slabs from the stacks, wherein the apparatus is the apparatus of claim 1.

13. The store for slabs of claim 12, wherein the movement system comprises a system for horizontal displacement of the supporting assembly.

14. The store for slabs of claim 12, further comprising stations for arrival or departure of slabs or stacks of slabs.

15. The store for slabs of claim 14, wherein the arrival or departure stations for slabs or stacks of slabs are provided with movable raising devices for alignment with a loading surface of the second carriage and for moving the slabs or stacks of slabs between the arrival or departure stations and said loading surface.

16. Method for positioning slabs in a store with an apparatus according to claim 1, comprising steps of:
  loading on the support surface of the second carriage a pack of stacked slabs supplied from one or more slab loading stations;
  moving the support assembly above a select store area; and
  picking up in sequence single slabs, via the pick-up means of the first carriage, from the support surface and depositing the single slabs in the select store area so as to form stacks of the single slabs.

17. The method of claim 16, wherein the step of picking up in sequence the single slabs and depositing the single slabs in the select store area comprises:
  positioning the pick-up means of the first carriage above the support surface of the second carriage, lowering the pick-up means until coming in contact with a first slab of the pack of stacked slabs, and then gripping the first slab;
  raising the first slab and positioning the first carriage above a depositing location of the store area; and
  lowering the pick-up means onto the depositing location and releasing the first slab.

18. Method for forming a pack of slabs by means of an apparatus according to claim 1, comprising steps of:
  moving the supporting assembly above a depositing location of a store area from where a slab is to be removed;
  transferring the slab, via the pick-up means of the first carriage, from the depositing location to the supporting surface of the second carriage;
  repeating the preceding moving and transferring steps in order to form a pack of slabs on the support surface of the second carriage;
  moving the second carriage into an unloading station; and
  unloading the pack of slabs from the support surface of the second carriage into the unloading station.

19. The method of claim 18, wherein the step of transferring the slab comprises:
  positioning the pick-up means of the first carriage above the slab;
  lowering the pick-up means of the first carriage until resting on the slab, and gripping the slab;
  raising the pick-up means and subsequent displacement above the support surface of the second carriage; and
  lowering the pick-up means and releasing the slab.

20. The apparatus of claim 1, wherein the second carriage is sized to accommodate multiple loadings of the slabs from the first carriage prior to the slabs being removed.

* * * * *